US007886584B2

(12) United States Patent
Machida et al.

(10) Patent No.: US 7,886,584 B2
(45) Date of Patent: Feb. 15, 2011

(54) METHOD AND APPARATUS FOR DETECTING A STROKE OF A 4-CYCLE INTERNAL COMBUSTION ENGINE, BASED ON CHANGES IN ROTARY ENGINE SPEED

(75) Inventors: Kenichi Machida, Saitama (JP); Katsuhiro Ouchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 14 days.

(21) Appl. No.: 12/313,772

(22) Filed: Nov. 24, 2008

(65) Prior Publication Data

US 2009/0158832 A1 Jun. 25, 2009

(30) Foreign Application Priority Data

Dec. 20, 2007 (JP) ............................ 2007-328664

(51) Int. Cl.
*G01M 15/04* (2006.01)

(52) U.S. Cl. .................................................. 73/114.27

(58) Field of Classification Search ............... 73/114.27
See application file for complete search history.

(56) References Cited

U.S. PATENT DOCUMENTS 4,765,306 A * 8/1988 Scarnera et al. ............. 123/643
4,870,587 A 9/1989 Kumagai
5,433,108 A * 7/1995 Sawada ................... 73/114.27
6,032,649 A * 3/2000 Ono ...................... 123/406.58
6,070,567 A * 6/2000 Kakizaki et al. ....... 123/406.25
6,170,322 B1 * 1/2001 Yamazaki et al. ........ 73/114.27
6,378,358 B1 * 4/2002 Hirakata et al. .......... 73/114.27
6,505,128 B1 * 1/2003 Shimizu et al. ............... 702/33
6,935,168 B2 * 8/2005 Shimoyama ............. 73/114.28
7,013,719 B2 * 3/2006 Adachi et al. ............ 73/114.27
7,162,916 B2 * 1/2007 Zavarehi et al. .......... 73/114.13
7,194,898 B2 * 3/2007 Machida et al. .......... 73/114.01
7,249,495 B2 * 7/2007 Tsuyuguchi et al. ..... 73/114.27
2006/0218998 A1 * 10/2006 Machida et al. ............ 73/117.3

FOREIGN PATENT DOCUMENTS

JP 2541949 7/1996
JP 2003-074406 A 3/2003
JP 2004-124879 4/2004
JP 2007-056732 3/2007
JP 2007-182797 7/2007

* cited by examiner

*Primary Examiner*—Freddie Kirkland, III
(74) *Attorney, Agent, or Firm*—Carrier Blackman & Associates, P.C.; William D. Blackman; Joseph P. Carrier

(57) ABSTRACT

A stroke detection apparatus performs a stroke detection of 4-cycle engine based on a rotary engine speed when a throttle opening is large. A first crank-pulse time interval between a crank pulse inputted before a top dead center by 30°, and a crank pulse of the top dead center is measured by a pulse-interval calculation unit, and at the same time, a second crank-pulse time interval between a crank pulse inputted after the top dead center by 60° and a crank pulse inputted after the top dead center 90° is measured. An interval difference calculation unit calculates time-interval difference by subtracting the second crank-pulse time interval from the first crank-pulse time interval, for two continuous top dead centers. A stroke detection unit determines whether two top dead centers are a compression top dead center or an exhaust top dead center based on magnitudes of the time-interval differences.

13 Claims, 5 Drawing Sheets

METHOD AND APPARATUS FOR DETECTING A STROKE OF A 4-CYCLE INTERNAL COMBUSTION ENGINE, BASED ON CHANGES IN ROTARY ENGINE SPEED

CROSS-REFERENCE TO RELATED APPLICATIONS

The present application claims priority under 35 USC §119 based on Japanese patent application No. 2007-328664, filed on Dec. 20, 2007. The entire subject matter of this priority document, including specification, claims and drawings, is incorporated by reference herein.

BACKGROUND OF THE INVENTION

1. Field of the Invention

The present invention relates to method and apparatus for detecting a stroke of a 4-cycle engine. More particularly, the present invention relates to method and apparatus of the type described, which enhances accuracy of stroke detection in an operational region having a low rotary engine speed and a large throttle opening.

2. Description of the Background Art

There is a known 4-cycle internal combustion engine having a control device (including stroke detection apparatus) for determining optimum ignition timing. This type of known engine is described, for example, in published Japanese patent document JP-A-2007-182797. In the single-cylinder 4-cycle engine disclosed by this reference, an intake manifold vacuum changes over time, in a region where a rotary speed of the engine is low and a throttle opening is small.

In other words, although an upward peak appears in an intake vacuum waveform in a region extending from an exhaust stroke to an intake stroke of the engine, the upward peak does not appear in a region extending from a compression stroke to a power stroke. Accordingly, conventionally, the stroke detection is performed based on monitoring changes in the intake manifold vacuum.

However, there may be a situation in which the stroke detection based on such intake manifold vacuum cannot be performed. For example, in a motorcycle which performs off-road traveling, there may be a case when rotation of a rear wheel is instantaneously stopped by applying a full-braking operation to a rear wheel or the like. Here, the rotation of a crankshaft is also instantaneously stopped. Hence, a stage which is allocated to each predetermined crank angle cannot be recognized by reference to changes in intake manifold vacuum.

Accordingly, when the rear-wheel brake is released thereafter, so that the rear wheel is rotated and a traveling state of the motorcycle is resumed to normal traveling, it is necessary to quickly determine a stroke and a crank reference position for every crank angle of 360°. When a throttle is opened widely for accelerating quickly to a normal traveling speed, the crank angle reference position can be determined, but the intake manifold vacuum is hardly changed due to the open throttle, and the intake vacuum is temporarily brought into a flat, unchanged state. Hence, the stroke detection based on the intake manifold vacuum cannot be performed, whereby there may be a possibility that the engine cannot provide peak performance.

Alternatively, the stroke detection may be performed based on other information besides a change in the intake manifold vacuum.

For example, there is a known method of stroke determination, disclosed in the Japanese patent document JP-A-2007-182797, which detects a crank pulse period in a crank stage including a top dead center position. The method of this reference determines a currently-performed stroke as a compression stroke when a detected period is longer than a reference period, and determines the currently-performed stroke as an exhaust stroke when the a detected period is shorter than a reference period. According to the stroke determination method as disclosed in the Japanese patent document JP-A-2007-182797, it is possible to perform the stroke detection during approximately one rotation of the crank after starting the engine.

Further, the Japanese patent document JP-A-2004-124879 discloses a stroke detection method used in a single-cylinder engine which performs stroke detection by equally dividing two rotations of the crank, that is, one cycle in four, by measuring a time for every ¼ cycle, and by recognizing a change pattern of a crank angular velocity.

Also, the Japanese Patent No. 2541949 discloses a stroke detection method for a single-cylinder engine, which performs the stroke detection by comparing rotary speeds at positions before and after a top dead center orientation of the crankshaft.

However, in the method disclosed in the Japanese patent document JP-A-2007-182797, the crank pulse period is compared with the reference period. Hence, the method is not applicable to various starting variations such as kick starting or cell starting, whereby there may be a possibility that the stroke detection cannot be performed in such conditions.

Further, in the methods disclosed in the Japanese patent document JP-A-2004-124879 and the Japanese Patent No. 2541949, although the change of the angular velocity sufficient for performing the stroke detection can be acquired in a low-rotary speed range where the change of rotation during one cycle is large, the change of rotation during one cycle is small in a high-rotary speed range. Hence, there exists a possibility that the change of an angular velocity sufficient for performing the stroke detection cannot be acquired. Accordingly, it is desirable to enlarge a region where the stroke detection can be performed.

The present invention has been made to overcome such drawbacks of existing stroke determination methods and apparatus. Accordingly, it is one of the objects of the present invention to provide a method and apparatus for stroke detection of a 4-cycle engine which can overcame the above-mentioned drawbacks of the known art, and which can perform stroke determination in an enlarged determination region. Particularly, it is an object of the present invention to provide a method and apparatus for a stroke detection apparatus of a 4-cycle engine, which is capable of detecting the stroke with a high accuracy in an operation region where a rotary speed of the engine is low, and a throttle opening is large.

SUMMARY OF THE INVENTION

In order to achieve the above-mentioned objects, the present invention according to a first aspect thereof provides a method and apparatus for stroke detection of a 4-cycle engine which determines an intake stroke and a power stroke based on a time period in which a crank is rotated by a predetermined crank angle, detected from crank pulses.

The stroke detection apparatus includes a rotary engine speed detection unit for calculating rotary engine speeds based on crank-pulse time intervals measured at two positions before and after a top dead center position, a rotary engine speed difference determination unit for calculating the difference between the rotary engine speeds (which are detected by the rotary engine speed detection unit) at the two positions, and a stroke detection unit for distinguishing between an intake stroke and a compression stroke based on the difference between the rotary engine speeds calculated with respect to two continuous preceding and succeeding top dead centers.

The present invention according to a second aspect thereof is characterized in that, when the difference between rotary engine speeds detected with respect to the succeeding top dead center between the top dead centers at said two positions is greater than the difference between rotary engine speeds detected with respect to the preceding top dead center between the top dead centers at said two positions, it is determined that the succeeding top dead center is a compression top dead center and a stroke of the engine at the time of detecting the succeeding top dead center is a power stroke.

The present invention according the second aspect thereof is also characterized in that when the difference between rotary engine speeds detected with respect to the succeeding top dead center between the top dead centers at the two positions is less than the difference between rotary engine speeds detected with respect to the preceding top dead center between the top dead centers at the two positions, it is determined that the succeeding top dead center is an intake top dead center and a stroke of the engine at the time of detecting the succeeding top dead center is an intake stroke.

The present invention according to a third aspect thereof provides a stroke detection apparatus of a 4-cycle engine which determines an intake stroke and a power stroke based on a time in which a crank is rotated by a predetermined crank angle detected based on crank pulses.

The stroke determination apparatus according to the third aspect of the present invention includes an interval measuring unit for measuring crank-pulse time intervals at two positions before and after a top dead center, an interval difference detection unit for calculating the difference between the crank-pulse time intervals at the two positions which are measured by the interval measuring unit, and a stroke detection unit for distinguishing between the intake stroke and a compression stroke based on the difference between the crank-pulse time intervals which are measured with respect to two continuous preceding and succeeding top dead centers.

The present invention according to a fourth aspect thereof is characterized in that, when the difference between crank-pulse time intervals which are detected with respect to the succeeding top dead center between the top dead centers at the two positions is greater than the difference between crank-pulse time intervals detected with respect to the preceding top dead center between the top dead centers at the two positions, the succeeding top dead center is a compression top dead center and a stroke of the engine at the time of detecting the succeeding top dead center is a power stroke.

The present invention according to a fourth aspect thereof is also characterized in that, when the difference between crank-pulse time intervals detected with respect to the succeeding top dead center between the top dead centers at the two positions is less than the difference between crank-pulse time intervals detected with respect to the preceding top dead center between the top dead centers at the two positions, the succeeding top dead center is an intake top dead center and a stroke of the engine at the time of detecting the succeeding top dead center is an intake stroke.

The present invention according to a fifth aspect thereof is characterized in that the crank-pulse time intervals at two positions includes the crank-pulse time interval between a point of time before the top dead center by 30° and the top dead center, and the crank-pulse time interval between a point of time after the top dead center by 60° and a point of time after the top dead center by 90°.

Further, the present invention according to a sixth aspect thereof is characterized in that the stroke detection apparatus of a 4-cycle engine performs the stroke detection based on a change of a negative pressure of an intake pipe in an operation region when a throttle opening is less than a predetermined throttle opening, and performs the stroke detection using the stroke detection apparatus having the aspects according to any one of the first through fifth aspects of the present invention in an operation region where the throttle opening is greater than the predetermined throttle opening.

Advantages of the Invention

The rate of change of the rotary engine speed after the compression top dead center is greater than the rate of change of the rotary engine speed after the exhaust top dead center. Accordingly, in the present invention, the detection between the compression top dead center and the exhaust top dead center is performed by making use of the difference the in rate of change, and the detection between the power stroke and the intake stroke is performed based on the detection result of the compression top dead center and the exhaust top dead center.

The difference in rate of change can be determined by detecting the change quantities of the crank-pulse time intervals at two predetermined positions before and after the compression top dead center with respect to two continuous top dead centers and by deciding which one of the change quantities detected with respect to both top dead centers is greater.

According to the first through fifth aspects of the present invention, the stroke detection can be performed by sensing the rotary engine speed (or the crank-pulse time interval which represents the rotary engine speed). Hence, also where the stroke detection cannot be performed using the intake manifold vacuum, particularly in an operation region where the throttle opening is large and the change of the intake manifold vacuum is small, the stroke detection can be performed based on only an output of the crank angle sensor without using the cam pulser.

According to the sixth aspect of the present invention, it is possible to selectively use the stroke detection apparatus based on the rotary engine speed and the intake manifold vacuum corresponding to the throttle opening. Hence, the stroke detection can be performed in a large operational region without using the cam pulser.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

Figure 2:
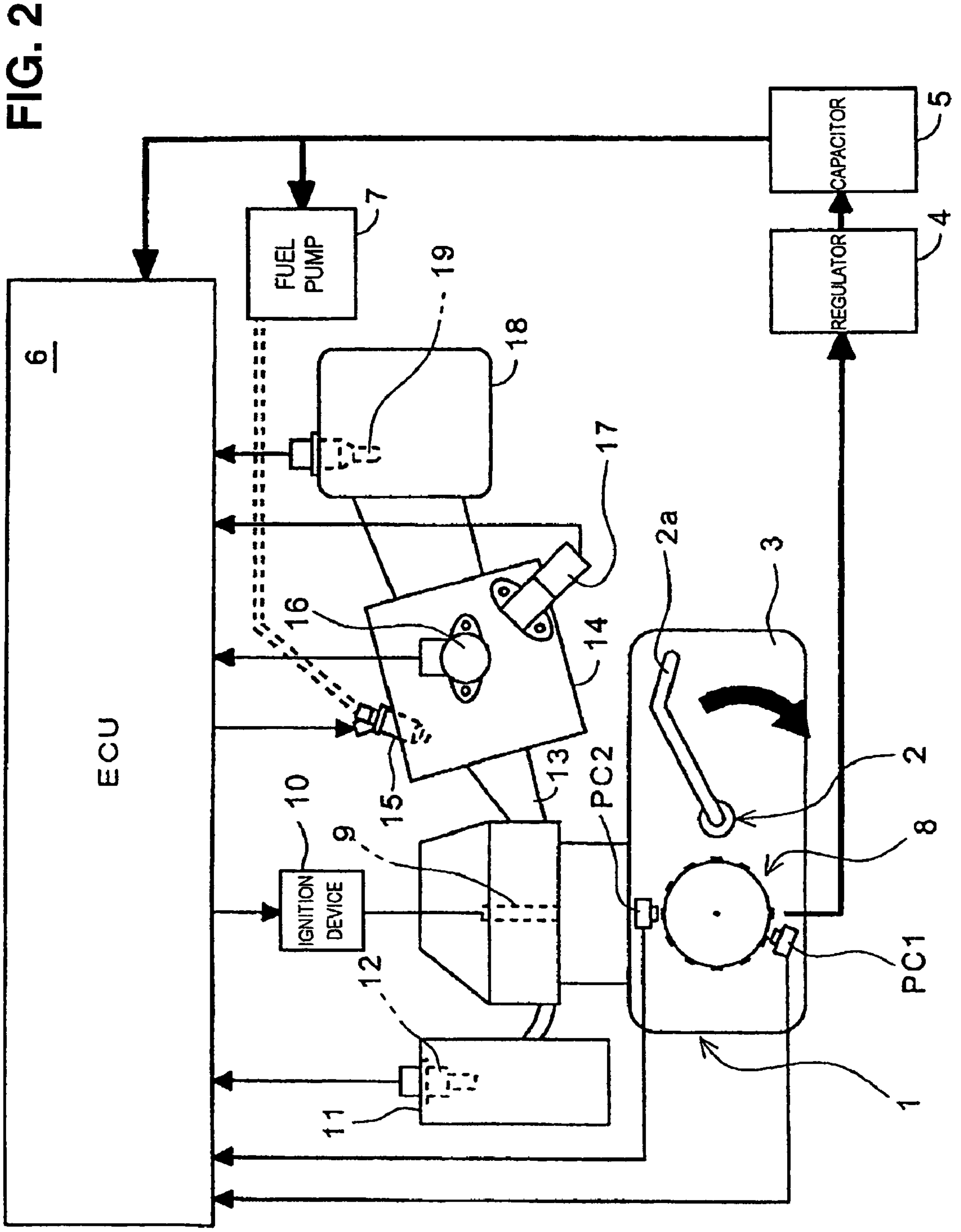
FIG. 2 is a black diagram showing an engine control apparatus which includes the stroke detection apparatus according to the illustrative embodiment of the present invention.

Hereinafter, an illustrative embodiment of the present invention is explained in conjunction with drawings. FIG. 2 is a block diagram showing a system configuration of an engine control apparatus including a stroke detection apparatus according to an illustrative embodiment of the present invention.

In the embodiment shown in FIG. 2, an engine 1 is a 4-cycle, single-cylinder internal combustion engine. The engine 1 includes an intake/exhaust valve assembly (not shown). The engine 1 also includes a kick-starter 2, having a kick pedal 2*a*, as a manual starting system. An operator of a vehicle having the engine 1 can start the engine 1 by rotating a crankshaft (not shown) by stepping down the kick pedal 2*a* projected from a crankcase 3. It will be understood that the crankshaft is attached to, and is coaxial with the crank rotor 8.

An AC generator (not shown) is operatively connected to the crankshaft. The engine 1 is started by the kick-starter 2. The engine 1 does not include a battery for storing electric power generated by the AC generator. In other words, the engine 1 is operated by a battery-free method. The electric power generated by the AC generator is supplied to an ECU 6, a fuel pump 7 and the like, via a regulator 4 and a capacitor 5. The capacitor 5 is provided for stabilizing a power source voltage by absorbing ripples in the supply of power from the generator.

Figure 3:
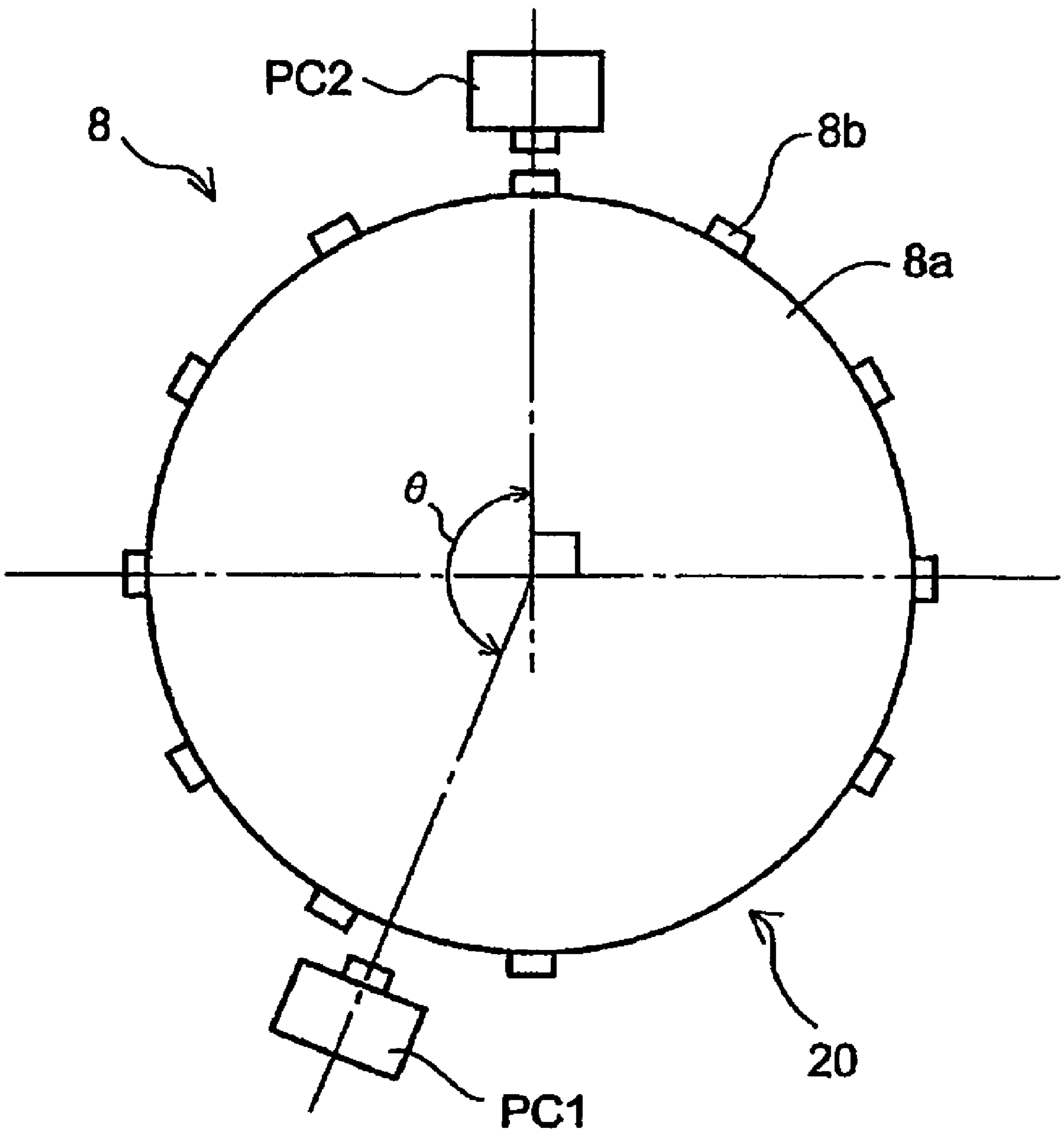
FIG. 3 is an enlarged front view of a crank rotor.

A crank rotor 8 (also referred as partially-non-toothed crank rotor 8) is operatively connected to the crankshaft for detecting a crank angle. As seen in FIGS. 2-3, a pair of magnetic pick-up type crank angle sensors (crank pulsers) PC1, PC2 are arranged on an outer periphery of the crank rotor 8. Teeth 8*b* are arranged around the crank rotor 8 for every crank angle of 30°, except that no tooth is formed on a non-toothed portion 20 of the crank rotor 8, where the non-toothed portion 20 extends for an area of 60 degrees of rotation of the crankshaft.

Accordingly, during operation of the engine, the crank pulsers PC1, PC2 output pulse signals (crank pulses) for every rotation of the crankshaft through an angle of 30°, and with respect to the non-toothed portion of the crank rotor 8 on which no tooth is formed, the crank pulse is outputted after rotation of the crankshaft through a crank angle of 60°.

A spark plug 9 is mounted on the engine 1. The spark plug 9 is operable to ignite an air-fuel mixture inside a combustion chamber (not shown) of the engine 1 with a high voltage supplied from an ignition device 10. A coolant temperature sensor 12 is mounted on a radiator 11, through which engine coolant is circulated.

A throttle body 14 is mounted on an intake pipe 13, which is operatively connected to the engine 1. A fuel injector 15 is mounted on the throttle body 14. The fuel injector 15 injects fuel, which is fed from a fuel pump 7 under pressure, inside the intake pipe 13. Further, a throttle position sensor 16 which detects a position of a throttle valve (not shown), and a manifold pressure sensor 17, (also referred as a PB sensor 17) which detects an intake manifold vacuum, are also mounted on the throttle body 14.

Further, an air cleaner box 18 is arranged upstream of the throttle body 14. The air cleaner box 18 introduces outside air through a filter arranged upstream of the throttle body 14. An intake temperature sensor 19 is also arranged in an inside portion of the air cleaner box 18.

The ECU (engine control unit) 6 operates the engine 1 in an optimum state, by controlling each of the fuel injector 15 and the ignition device 10 based on sensed engine parameters indicative of an operational state of the engine, where such parameters are detected by the crank pulsers PC1, PC2, the water temperature sensor 12, the throttle position sensor 16, the PB sensor 17 and the intake temperature sensor 19.

FIG. 3 is an enlarged front view of the crank rotor 8. The crank rotor 8 includes a rotary disk 8*a* which is attached to, and integrally rotated by the crankshaft. The crank rotor 8 also includes eleven teeth 8*b* formed on an outer peripheral portion of the rotary disk 8*a*. The teeth 8*b* are arranged for every crank angle of 30°, and the non-toothed portion 20, where an angle between the teeth 8*b* is set to 60°, is formed on a portion of the crank rotor 8.

The crank pulsers PC1, PC2 are arranged around the crank rotor 8 with a nip angle θ of 157.7 degrees. The crank pulsers PC1, PC2 output respective crank pulses for every time a tooth 8*b* is detected moving therepast. Hence, it is possible to detect the non-toothed portion 20 by monitoring detection intervals of the crank pulses. By providing a plurality of sensors such as the crank pulsers PC1, PC2, it is possible to recognize a 360-degrees-reference-position of the crankshaft in a short time, within which the crankshaft makes less than one complete rotation.

The following describes a method of stroke detection which is performed after the 360-degrees reference position of the crankshaft is recognized in response to the detection signals of the crank pulsers PC1, PC2, that is, detected crank pulses.

Figure 4:
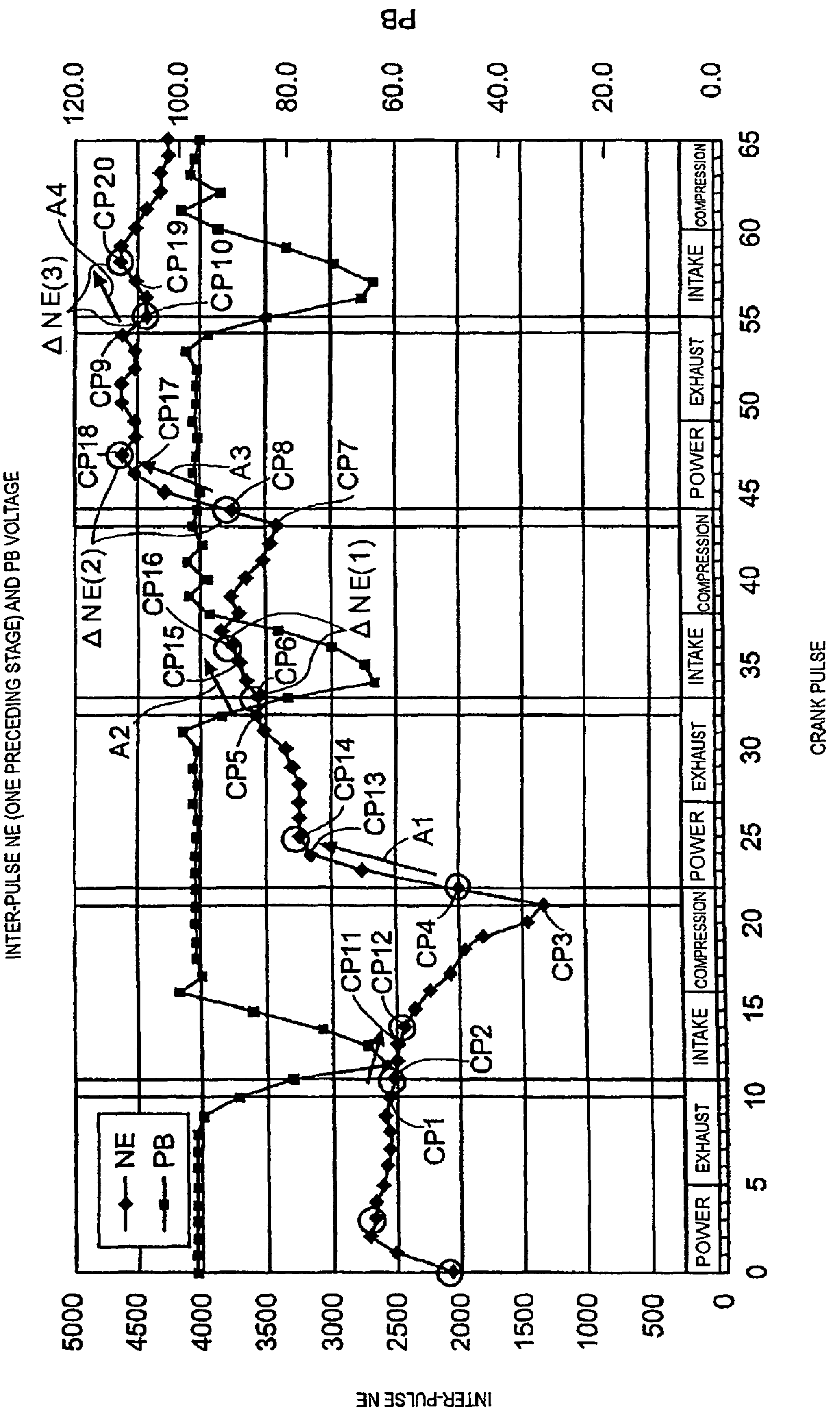
FIG. 4 is a view showing a graph of change of a rotary engine speed for every stroke.

FIG. 4 is a view showing a change of a rotary engine speed NE. FIG. 4 shows the change of the rotary engine speed NE over 3 cycles (12 strokes) of the engine from a start of the engine using the kick-starter 2. The change of the intake manifold vacuum PB is also shown in FIG. 4.

As shown in FIG. 4, the crank pulse number, that is, the stage number is represented on an axis of abscissas (x-axis), and the rotary engine speed is represented on an axis of ordinates (y-axis). As discussed above, the crank pulse is outputted by detecting the tooth 8*a* of the crank rotor 8. Hence, the stage corresponding to the non-toothed portion 20 is prolonged. However, with respect to the detection of the rotary engine speed NE, a crank pulse which may have been generated if the tooth 8*a* is formed on the non-toothed portion 20 is interpolated by an arithmetic operation.

The rotary engine speed NE is a value which is calculated each time the crank pulse is outputted based on a time interval between the present crank pulse and a crank pulse which is inputted immediately before the present crank pulse. With respect to the rotary engine speeds NE at starting points of the intake stroke and the power stroke of the engine, when the top dead center detection signal is inputted, an elapsed time which elapses from the crank pulse outputted immediately before inputting the top dead center signal is detected is the crank pulse time interval representing a rotary engine speed.

When the engine 1 is started by the kick-starter 2, as shown in FIG. 4, the rotary engine speed NE is once increased in the power stroke, and the rotary engine speed NE is decreased through the respective strokes consisting of the exhaust stroke, the intake stroke and the compression stroke. When the ignition plug 9 is operated to ignite the air-fuel mixture in this one cycle, the engine 1 is started, the rotary engine speed NE is gradually increased, and the operation of the engine 1 is shifted to a normal operation.

According to the present invention, a rate of change of the rotary engine speed NE in the intake stroke, and a rate of change of the rotary engine speed NE in the power stroke are required, in order to detect the current stroke. In order to observe the changes of the rotary engine speeds NE of the respective initial stages (3 stages) in the intake stroke and the power stroke, as indicated by arrows A1, A2, A3 and A4, all of the changing directions of the rotary engine speed NE after starting of the engine exhibit rising tendencies.

Accordingly, since all rotary engine speeds NE (e.g., shown by arrows A1, A2, A3, and A4) after starting of the engine exhibit rising tendencies, it is not possible to determine between the compression top dead center and the intake top dead center by merely comparing rising rates of the rotary engine speeds NE at the respective top dead centers with a reference rotary engine speed.

However, the difference between the rate of change in the power stroke and the rate of change in the intake stroke immediately after the power stroke, that is, the difference between the inclination of arrow A1 and the inclination of arrow A2 and the difference between the inclination of arrow A3 and the inclination of arrow A4 are apparent.

Here, in the illustrative embodiment, a rotary engine speed NE1 at the top dead center and a rotary engine speed NE2 at a third stage (crank angle: 90°) counted from the top dead center are detected, and a change quantity ΔNE (ΔNE=NE2−NE1) is calculated. The change quantity ΔNE is calculated with respect to the two continuous preceding and succeeding top dead centers. Further, two calculated change quantities, that is, the change quantity ΔNE(1) with respect to the preceding top dead center and the change quantity ΔNE with respect to the succeeding top dead center are compared to each other.

When the newly detected change quantity ΔNE is less than the previously detected change quantity ΔNE(1), out of two top dead centers, the latter top dead center is determined as the intake top dead center. On the hand, when the newly detected change quantity ΔNE is greater than the previously detected change quantity ΔNE(1), out of two top dead centers, the latter top dead center is determined as the compression top dead center.

Here, in order to obtain more accurate results, it is preferable that the compression top dead center and the intake top dead center are confirmed when the increase and the decrease of the change quantities are continued for predetermined period of time, for example, 3 cycles.

Figure 5:
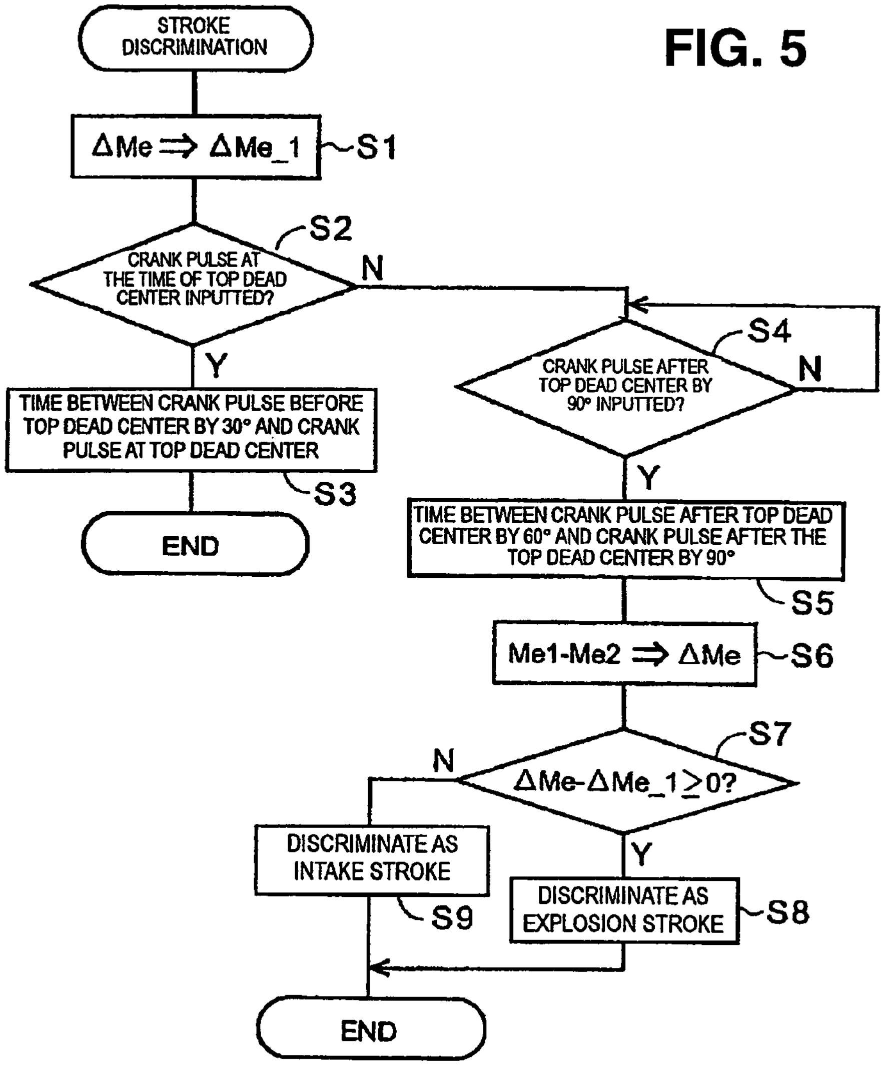
FIG. 5 is a flowchart showing a stroke detection processing.

FIG. 5 is a flowchart showing the stroke detection processing in the ECU 6. Here, in this processing, the rotary engine speed NE represents a time interval between a present crank pulse and a recent crank pulse immediately preceding the present crank pulse for every crank pulse. The time interval between the crank pulses is indicated by symbol Me.

As shown in FIG. 5, in step S1, a time interval change ΔMe between a first time interval Me1 at the time of the top dead center which is detected in the preceding processing, and a second time interval Me2 in the third stage counted from the top dead center is stored as a reference time interval difference ΔMe_1. In step S2, it is determined whether or not the crank pulse at the time of top dead center is inputted. When the crank pulse at the time of top dead center is inputted, the processing advances to step S3.

In step S3, a time interval between a crank pulse detected immediately before the top dead center (a pulse before the top dead center by 30°) and the crank pulse detected at the time of top dead center is measured, and the measured time interval is stored in the ECU 6 as a first time interval Me1. The first time interval Me1 indicates, for example, the difference in input time between crank pulses CP1, CP2, the difference in input time between crank pulses CP3, CP4, the difference in input time between crank pulses CP5, CP6, the difference in input time between crank pulses CP7, CP8, the difference in input time between crank pulses CP9, CP10, or the like, each as shown in FIG. 4.

When the determination result is negative in step S2, that is, when the detected crank pulse is not the crank pulse at the time of top dead center, the processing advances to step S4. In step S4, it is determined whether or not the crank pulse is a crank pulse after the top dead center by 90°, that is, a third crank pulse after the top dead center.

When the determination result is affirmative in step S4, the processing advances to step S5. In step S5, a time interval between a crank pulse after the top dead center by 60°, that is, a second crank pulse after the top dead center and a crank pulse after the top dead center by 90° is measured, and the measured time interval is stored in the ECU 6 as a second time interval Me2.

The second time interval Me2 indicates, for example, the difference in input time between crank pulses CP11, CP12, in FIG. 4, the difference in input time between the crank pulses CP13, CP14, the difference in input time between the crank pulses CP15, CP16, the difference in input time between the crank pulses CP17, CP18, the difference in input time between the crank pulses CP19, CP20 or the like, each as shown in FIG. 4.

In step S6, the time-interval difference ΔMe is calculated by subtracting the second time interval Me2 from the first time interval Me1. That is, the time-interval difference ΔMe is a value indicative of a change quantity of the rotary engine speed NE from a point of time of the top dead center to a point of time after the top dead center by 90°. Here, when the time-interval difference ΔMe is negative, it is determined that the rotary engine speed NE is increased.

In step S7, it is determined whether or not a result value obtained by subtracting the previously-detected reference time-interval difference ΔMe_1 from the currently-detected time interval ΔMe is greater than or equal to 0. When the determination in step S7 is affirmative, that is, when the current time-interval difference ΔMe is greater than the previous reference time-interval difference ΔMe_1, it is determined that the current engine-rotational-speed change is greater than the previous engine-rotational-speed change. When such determination is made, it is determined that the current top dead center is the compression top dead center and the currently-operated stroke is the power stroke.

On the other hand, when the determination result in step S7 is negative, that is, the current time-interval difference ΔMe is less than the previous reference time-interval difference ΔMe_1, it is determined that the current top dead center is the exhaust top dead center, and the currently-operated stroke is the intake stroke. In step S8 and step S9, flags respectively indicative of the power stroke and the intake stroke are set.

For example, as shown in FIG. 4, in order to compare an engine-rotational-speed change quantity ΔNE(1) and the engine-rotational-speed change quantity ΔNE(2), for example, the newly-detected engine-rotational-speed change quantity ΔNE(2) is greater than the engine-rotational-speed change quantity ΔNE(1), it is determined that a stroke at the time of detecting the engine-rotational-speed change quantity ΔNE(2) is a power stroke.

Further, in order to compare the engine-rotational-speed change quantity ΔNE(2) and an engine-rotational-speed change quantity ΔNE(3), when the newly-detected engine-rotational-speed change quantity ΔNE(3) is less than the engine-rotational-speed change quantity ΔNE(2), it is determined that a stroke at the time of detecting the engine-rotational-speed change quantity ΔNE(3) is an intake stroke.

Figure 1:
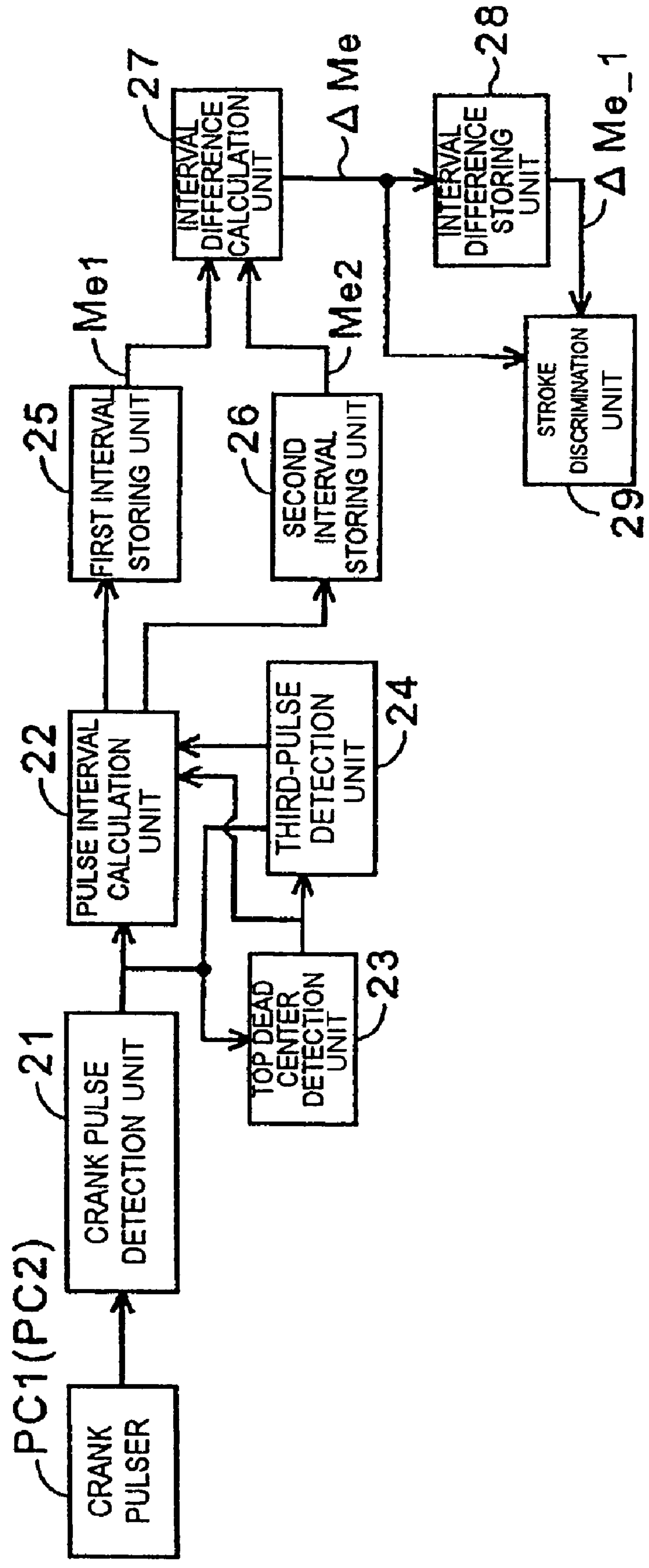
FIG. 1 is a block diagram showing various units of a stroke detection apparatus according to an illustrative embodiment of the present invention.

FIG. 1 is a block diagram showing functions of various units of a central processing unit (CPU) of the ECU 6 for performing the processing explained in conjunction with the flowchart shown in FIG. 5.

A crank-pulse sensor 21 detects crank pulses outputted from the crank pulsers PC1, PC2. A pulse-interval calculation unit 22 calculates the time intervals Me of the crank pulses by counting the number of clock intervals CK between the crank pulses.

The calculated time intervals Me are held in the pulse-interval calculation unit 22 until the next clock pulse is inputted. A top dead center detection unit 23 detects the non-toothed portion of the crank rotor 8 and, when the predetermined number of crank pulses which is counted from the non-toothed portion is inputted, outputs a top dead center detection signal, and the top dead center detection signal is inputted to the pulse-interval calculation unit 22 and a third-pulse detection unit 24.

The pulse-interval calculation unit 22 transfers the time intervals Me stored therein to a first interval storing unit 25 in response to the top dead center detection signal. The first interval storing unit 25 stores the inputted time interval Me as the time interval Me1.

The third-pulse detection unit 24 counts the number of crank pulses detected by the crank pulse sensor 21 in response to the top dead center detection signal. When the third crank pulse is inputted, the third-pulse detection unit 24 inputs a third-pulse detection signal to the pulse-interval calculation unit 22.

When the third-pulse detection signal is inputted to the pulse-interval calculation unit 22, the pulse-interval calculation unit 22 transfers the time interval Me held therein to a second interval storing unit 26. The second interval storing unit 26 stores the inputted time interval Me as the time interval Me2.

The time interval Me which is held by the pulse-interval calculation unit 22 when the third-pulse detection signal is inputted to the pulse-interval calculation unit 22 is a time between 60° and 90° from the top dead center.

An interval-difference calculation unit 27 reads out the time intervals Me1, Me2 from the first interval storing unit 25 and the second interval storing unit 26 and calculates the time-interval difference ΔMe using a formula "ΔMe=Me1−Me2". The time-interval difference ΔMe is inputted to an interval-difference storing unit 28 and a stroke detection unit 29.

When the new time-interval difference ΔMe is inputted to the interval-difference storing unit 28, the interval-difference storing unit 28 inputs the previous time-interval difference ΔMe to the stroke detection unit 29 as a previous time-interval difference ΔMe_1.

Based on the currently-calculated time-interval difference ΔMe and the previous time-interval difference ΔMe_1, the stroke detection unit 29 determines whether or not the current time-interval difference ΔMe is greater than or equal to the previous time-interval difference ΔMe_1 using a formula "ΔMe−(ΔMe_1)≧0".

When the time-interval difference ΔMe is greater than the time-interval difference ΔMe_1, the currently-detected engine-rotational-speed change is greater than (or equal) to the previously-detected engine-rotational-speed change. Accordingly, the stroke detection unit 29 outputs a detection signal indicating that the currently-operated stroke is a power stroke.

When the current time-interval difference ΔMe is less than the previous time-interval difference ΔMe_1, the currently-detected engine-rotational-speed change is less than the previously-detected engine-rotational-speed change. Accordingly, the stroke detection unit 29 outputs a detection signal indicating that the currently-operated stroke is an intake stroke.

As described above, in the illustrative embodiment, by respectively comparing the crank-pulse time interval between a point of time that the crank pulse is inputted before the top dead center by 30° and the top dead center, and the crank pulse time interval between a point of time that the crank pulse is inputted after the top dead center by 60° and a point of time that the crank pulse inputted after the top dead center by 90° to each other, the rotary engine speed can be detected in a short time based on the crank-pulse intervals. Thus, the present invention allows, more accurately detecting the compression top dead center and the exhaust top dead center.

Here, when the throttle opening TH is small, the intake manifold vacuum detected by the PB sensor 17 is sharply lowered in the intake stroke immediately after the exhaust top dead center. Hence, in such situations, it is desirable to perform the stroke detection based on the change of the intake manifold vacuum.

On the other hand, in an operation state such that the throttle valve is suddenly opened at the time of low-speed driving of the engine, the throttle opening TH is large. Hence, the intake manifold vacuum is not lowered even in the intake stroke so that the intake stroke is hardly determined from other strokes. In such situations, it is desirable to perform the stroke detection based on the crank-pulse time interval, as discussed above.

Accordingly, it is desirable to use the stroke detection based on the peripheral intake manifold vacuum and the stroke detection based on an instantaneous rotary engine speed (based on the crank-pulse time interval) in combination for optimal engine operation.

Figure 6:
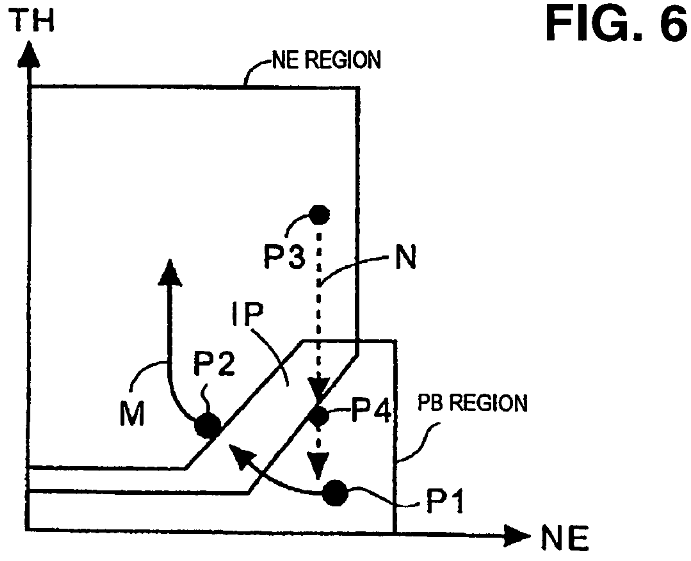
FIG. 6 is a schematic view showing a stroke-detection performing region.

FIG. 6 is a schematic view showing a stroke detection performing region. In FIG. 6, the rotary engine speed NE is represented on an axis of abscissas (x-axis) and the throttle opening TH is represented on an axis of ordinates (y-axis). A stroke detection region (PB region) based on the intake manifold vacuum is arranged in a range where the throttle opening TH is small, and the stroke detection region based on the instantaneous rotary engine speed (NE region) is arranged in a range where the throttle opening TH is large. The PB region has a range thereof where the throttle opening TH is small is partially enlarged such that the enlarged range overlaps with the NE region.

However, with respect to this enlarged range of the PB region which overlaps with the NE region, a portion where the rotary engine speed NE is large does not constitute the NE region and the PB region expands with the relatively large throttle opening TH.

In the region where the NE region and the PB region overlap with each other, stroke detection is continuously performed using the currently-performed detection method, and once the operation escapes from the overlapping region IP, the stroke detection is again performed based on the current region using either the rotary engine speed NE or the intake manifold vacuum PB.

For example, in a situation, in which the stroke detection is performed using the intake manifold vacuum PB at a point P1 within the PB region and the state for performing the stroke detection is changed in the direction indicated by an arrow M. In this case, the stroke detection using the intake manifold vacuum PB is continued in the overlapping region IP.

Then, when the state gets over the overlapping region IP and reaches a point P2 within the NE region, the stroke detection is shifted from the stroke detection based on the intake manifold vacuum PB to the stroke detection based on the rotary engine speed NE, and the stroke detection is again performed.

In contrast, in a situation, in which the stroke detection is performed using the rotary engine speed NE at a point P3 within the NE region and the state for performing the stroke detection is changed in the direction indicated by an arrow N. In this case, the stroke detection using the rotary engine speed NE is continued in the overlapping region IP.

Then, when the state gets over the overlapping region IP and reaches a point P4 within the PB region, the stroke detection is shifted from the stroke detection based on the rotary engine speed NE to the stroke detection based on the intake manifold vacuum PB, and the stroke detection is then performed based on the intake manifold vacuum. PB.

Here, in FIG. 6, the rotary engine speed NE at the time of determining the NE region and the PB region is not a rotary speed which is calculated based on one time interval between the crank pulses but a value which is obtained by a rotary engine speed detection method which uses an average value of the time intervals of the respective crank pulses inputted over the crank angle of 360°. Other known methods for obtaining rotary engine speed may be used.

In the above-mentioned embodiments, although the present invention is explained in accordance with the illustrative modes for carrying out the present invention, the present invention is not limited to the above-mentioned embodiments, and includes modifications of the embodiments without departing from claims of this application.

For example, in the illustrative embodiment, although the change quantity of the rotary engine speed is limited to the change quantity of the rotary engine speed within the range from top dead center to 90° from the top dead center, the present invention is not limited to such a range. The stroke detection may be performed by detecting the time intervals between a plurality of crank pulses before and after the top dead center with respect to two continuous top dead centers and by detecting the stroke based on the respective rates of change quantities.

Although the present invention is described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A stroke detection apparatus of a 4-cycle engine for detecting an intake stroke and a power stroke based on a time period during which a crankshaft of the engine is rotated through a predetermined crank angle which is sensed via monitored crank pulses, said stroke detection apparatus comprising:

a rotary engine speed detection unit for calculating rotary engine speeds based on respective crank-pulse time intervals measured at two crank positions which are located before and after a top dead center orientation of said crankshaft;

a speed difference determination unit for calculating a difference between the sensed rotary engine speeds at said two crank positions detected by said rotary engine speed detection unit;

a throttle position sensor for detecting a throttle opening; and a stroke detection unit operable to distinguish between an intake stroke and a power stroke depending on the detected throttle opening according to either change in a pressure in an intake pipe or sensed rotary engine speeds at two said crank positions for two successive rotations of said crankshaft including a successive top dead center and a preceding top dead center;

wherein when said detected throttle opening is less than a predetermined throttle opening, said stroke detection unit performs stroke detection based on a change of a negative pressure of said intake pipe of the engine in an operation region; and when said detected throttle opening is greater than said predetermined throttle opening, said stroke detection unit performs stroke detection based on said difference between the crank-pulse time intervals measured with respect to two successive rotations of said crankshaft including a successive top dead center and a preceding top dead center.

2. A stroke detection apparatus of a 4-cycle engine according to claim 1, wherein:

when a calculated difference between the sensed rotary engine speeds at said two positions in relation to the successive rotation is greater than the calculated difference between the sensed rotary engine speeds at said two positions in relation to the preceding rotation, the stroke detection unit determines that the successive top dead center is a compression top dead center, and that a successive stroke of the engine is a power stroke, and when the calculated difference between the sensed rotary engine speeds at said two positions in relation to the successive rotation is less than the calculated difference between the sensed rotary engine speeds at said two positions in relation to the preceding rotation, the stroke detection unit determines that the successive top dead center is an intake top dead center, and that a successive stroke of the engine is an intake stroke.

3. A stroke detection apparatus of a 4-cycle engine according to claim 2, wherein the crank-pulse time intervals at said two positions includes a first crank-pulse time interval measured between a point of time when the crankshaft is oriented 30 degrees before top dead center and a point in time when the crankshaft is oriented at top dead center, and a second crank-pulse time interval measured between a point in time when the crankshaft is oriented 60 degrees after top dead center and a point in time when the crankshaft is oriented 90 degrees after top dead center.

4. A stroke detection apparatus of a 4-cycle engine according to claim 1, wherein the crank-pulse time intervals at said two positions includes a first crank-pulse time interval between a point of time when the crankshaft is oriented 30 degrees before top dead center and a point in time when the crankshaft is oriented at top dead center, and a second crank-pulse time interval between a point in time when the crankshaft is oriented 60 degrees after top dead center and a point in time when the crankshaft is oriented 90 degrees after top dead center.

5. A stroke detection apparatus of a 4-cycle engine according to claim 1, wherein said engine is a single-cylinder kick start engine.

6. A stroke detection apparatus of a 4-cycle engine for detecting an intake stroke and a power stroke based on a time period during which a crankshaft of the engine is rotated through a predetermined crank angle which is sensed via monitored crank pulses, said stroke detection apparatus comprising:

an interval measuring unit for measuring respective crank-pulse time intervals at two positions which are located before and after a top dead center orientation of said crankshaft;

an interval difference determination unit for calculating a difference between the measured crank-pulse time intervals at said two positions;

a throttle position sensor for detecting a throttle opening; and a stroke detection unit which distinguishes between the intake stroke and a power stroke, depending on the detected throttle opening according to either change in a pressure in an intake pipe or sensed rotary engine speeds at two said crank positions based on two successive rotations of said crankshaft including a successive top dead center and a preceding top dead center wherein when said detected throttle opening is less than a predetermined throttle opening, said stroke detection unit performs stroke detection based on a change of a negative pressure of an intake pipe of the engine in an operation region; and when said detected throttle opening is greater than said predetermined throttle opening, said stroke detection unit performs stroke detection based on said difference between the crank-pulse time intervals measured with respect to two successive rotations of said crankshaft including a successive top dead center and a preceding top dead center.

7. A stroke detection apparatus of a 4-cycle engine according to claim 6, wherein when the calculated difference between crank-pulse time intervals at said two positions, in relation to the successive rotation, is greater than the calculated difference between crank-pulse time intervals at said two positions in relation to the previous rotation, the stroke detection unit determines that the successive top dead center is a compression top dead center and that a successive stroke of the engine is a power stroke; and when the calculated difference between crank-pulse time intervals at said two positions, in relation to the successive rotation, is less than the calculated difference between crank-pulse time intervals at said two positions in relation to the preceding rotation, the stroke detection unit determines that the successive top dead center is an intake top dead center, and that a successive stroke of the engine is an intake stroke.

8. A stroke detection apparatus of a 4-cycle engine according to claim 6, wherein the crank-pulse time intervals at said two positions includes a first crank-pulse time interval measured between a point of time when the crankshaft is oriented 30 degrees before top dead center and a point in time when the crankshaft is oriented at top dead center, and a second crank-pulse time interval measured between a point in time when the crankshaft is oriented 60 degrees after top dead center and a point in time when the crankshaft is oriented 90 degrees after top dead center.

9. A stroke detection apparatus of a 4-cycle engine according to claim 6, wherein said engine is a single-cylinder kick start engine.

10. A method for detecting an intake stroke and a power stroke of a 4-cycle internal combustion engine based on a time period during which a crankshaft of the engine is rotated by a predetermined crank angle detected based monitoring of on crank pulses, said method comprising the steps of:

a) calculating rotary engine speeds based on crank-pulse time intervals measured at two positions of said crankshaft, where said two positions are located before and after a top dead center orientation of the crankshaft;

b) calculating a difference between sensed rotary engine speeds at said two positions;

c) detecting a throttle opening; and d) distinguishing between the intake stroke and the power stroke depending on the detected throttle opening according to either change in a pressure in an intake pipe or sensed rotary engine speeds at two said crank positions for two successive rotations of said crankshaft, including a successive top dead center and a preceding top dead center e) monitoring a change of negative pressure in the intake pipe of the engine;

f) when said detected throttle opening is less than a predetermined throttle opening, performing stroke detection based on the change of negative pressure in the intake pipe; and g) when said detected throttle opening is greater than said predetermined throttle opening, performing stroke detection based on said difference between the crank-pulse time intervals measured with respect to two successive rotations of said crankshaft including a successive top dead center and a preceding top dead center.

11. A method for detecting an intake stroke and a power stroke of a 4-cycle internal combustion engine according to claim 10, wherein when the calculated difference between sensed rotary engine speeds at said two positions in relation to a successive rotation is greater than the calculated difference between sensed rotary engine speeds at said two positions in relation to the preceding rotation, the successive top dead center is determined to be a compression top dead center and a successive stroke of the engine is determined to be a power stroke, and when the calculated difference between sensed rotary engine speeds at said two positions in relation to the successive rotation is less than the calculated difference between sensed rotary engine speeds at said two positions in relation to the preceding rotation, the successive top dead center is determined to be an intake top dead center and a successive stroke of the engine is determined to be an intake stroke.

12. A method for detecting an intake stroke and a power stroke of a 4-cycle internal combustion engine according to claim 11, wherein the crank-pulse time intervals at said two positions includes a first crank-pulse time interval between a point of time when the crankshaft is oriented 30 degrees before top dead center and a point in time when the crankshaft is oriented at top dead center, and a second crank-pulse time interval between a point in time when the crankshaft is oriented 60 degrees after top dead center and a point in time when the crankshaft is oriented 90 degrees after top dead center.

13. A method for detecting an intake stroke and a power stroke of a 4-cycle internal combustion engine according to claim 10, wherein the crank-pulse time intervals at said two positions includes a first crank-pulse time interval between a point of time when the crankshaft is oriented 30 degrees before top dead center and a point in time when the crankshaft is oriented at top dead center, and a second crank-pulse time interval between a point in time when the crankshaft is oriented 60 degrees after top dead center and a point in time when the crankshaft is oriented 90 degrees after top dead center.

* * * * *